(12) United States Patent
Bader (10) Patent No.: US 11,396,258 B2
(45) Date of Patent: Jul. 26, 2022

(54) SELF-ADAPTING EMERGENCY VEHICLE LIGHTING SYSTEM

(71) Applicant: Federal Signal Corporation, Oak Brook, IL (US)

(72) Inventor: Joseph F. Bader, Monee, IL (US)

(73) Assignee: Federal Signal Corporation, Oak Brook, IL (US)

(*) Notice: Subject to any disclaimer, the term of this patent is extended or adjusted under 35 U.S.C. 154(b) by 16 days.

(21) Appl. No.: 17/017,947

(22) Filed: Sep. 11, 2020

(65) Prior Publication Data

US 2021/0078487 A1 Mar. 18, 2021

Related U.S. Application Data

(60) Provisional application No. 62/900,811, filed on Sep. 16, 2019.

(51) Int. Cl.
*B60Q 1/24* (2006.01)
*B60Q 1/40* (2006.01)
*H05B 47/11* (2020.01)
*H05B 47/115* (2020.01)
*B60Q 1/46* (2006.01)
*B60Q 1/52* (2006.01)
*B60Q 1/26* (2006.01)

(52) U.S. Cl.
CPC ........... *B60Q 1/245* (2013.01); *B60Q 1/24* (2013.01); *B60Q 1/2611* (2013.01); *B60Q 1/46* (2013.01); *B60Q 1/52* (2013.01); *H05B 47/115* (2020.01)

(58) Field of Classification Search
CPC . B60Q 1/245; B60Q 1/46; B60Q 1/52; B60Q 1/085; B60Q 1/24; B60Q 1/2611; B60Q 9/008; H05B 47/115; Y02B 20/40; G08G 1/166
See application file for complete search history.

(56) References Cited

U.S. PATENT DOCUMENTS

| | | | |
|---|---|---|---|
| 5,493,269 A | 2/1996 | Durley | |
| 8,723,680 B1* | 5/2014 | Baker | G08G 1/0965 340/686.6 |
| 9,002,313 B2 | 4/2015 | Sink et al. | |
| 9,950,657 B2* | 4/2018 | Dellock | B60Q 1/2611 |
| 10,384,594 B2* | 8/2019 | Cerrano | B60Q 1/24 |
| 10,548,173 B2* | 1/2020 | Jackson | G08G 1/0965 |
| 2009/0160678 A1 | 6/2009 | Turnbull | |

(Continued)

FOREIGN PATENT DOCUMENTS

| | | |
|---|---|---|
| CN | 109484289 A | 3/2019 |
| DE | 102015109932 A1 | 12/2016 |
| EP | 1375267 A2 | 1/2004 |

OTHER PUBLICATIONS

International Search Report and Written Opinion dated Jan. 22, 2021 in PCT/US2020//050718, 19 pages.

*Primary Examiner* — Vibol Tan
(74) *Attorney, Agent, or Firm* — Merchant & Gould P.C.

(57) ABSTRACT

Lighting systems for emergency vehicles. The lighting systems adjust light emission characteristics of lighting devices of the vehicle based on one or more detected conditions in the vicinity of the vehicle. The conditions are detected in different zones around the vehicle. The lighting system is configured to adjust characteristics of the lighting devices based on the zone in which the condition is detected.

14 Claims, 9 Drawing Sheets

(56) References Cited

U.S. PATENT DOCUMENTS

| | | | |
|---|---|---|---|
| 2009/0273941 A1 | 11/2009 | Englander | |
| 2010/0283977 A1* | 11/2010 | Wang | G03B 21/204 |
| | | | 353/84 |
| 2011/0187559 A1* | 8/2011 | Applebaum | B60Q 1/00 |
| | | | 340/907 |
| 2013/0265787 A1* | 10/2013 | Cerrano | B60Q 1/24 |
| | | | 362/464 |
| 2017/0096095 A1 | 4/2017 | Uhrenholt | |
| 2017/0361801 A1 | 12/2017 | Dellock | |
| 2017/0368982 A1 | 12/2017 | Dellock | |
| 2019/0106050 A1 | 4/2019 | Kamhi | |

* cited by examiner

SELF-ADAPTING EMERGENCY VEHICLE LIGHTING SYSTEM

BACKGROUND

Vehicular emergency warning lights are used to inform the public that an emergency vehicle is in emergency response mode traveling to an emergency scene or is stationary and blocking at an emergency scene. For example, when an emergency vehicle is asking for the right of way in traffic, both the emergency warning lights and the siren are operating together, to provide the most effective warning to the public. When the emergency vehicle is stopped or in blocking mode, only lighting is used to provide warning of the emergency vehicle's presence.

SUMMARY

There are three aspects to understanding how an emergency warning lighting system warns, and all three aspects involve physics of optics and human factors.

Detection:

Studies have shown for many years that a flashing light has greater conspicuity than a light that does not change intensity or changes intensity slowly. This is true when the flashing light is also among other non-flashing lights, but as with all noise sources such as other lights trying to gather our attention, signal to noise ratio, color and contrast all play a part in our ability to detect a light source. The best way to improve detection is to maximize contrast of the light source that you need to be differentiated from other lights/lighting noise sources. One of the best ways to do this is to flash the light and use a different color than the surrounding lights/environment.

Sunlight plays a large part in light detection, as bright sunlight levels are considered a large noise source, so color contrast combined with very high light output is a typical approach used to improve conspicuity of a flashing emergency light in bright sunlight.

In nighttime situations, the ability to detect an emergency vehicle light is greatly improved, as the warning light is no longer competing with sunlight. Effective nighttime distances for emergency warning lights can be greater than 5000 feet.

Airplane cockpit studies have also shown that faster flashing lights are perceived to have a higher level of urgency for human observers.

Recognition:

Recognition is our ability to identify that the light we see is an emergency warning light. This is more difficult, as several colors of warning lights are used on emergency vehicles. The colors red and blue are the most prevalent colors used on police vehicles. The colors red, white and amber are commonly used on ambulances and fire trucks and only amber is used for work and slow-moving vehicles.

One issue in recognition of emergency warning lights is that flashing lights on roadways are also used on barricades, on top of road signs and on overhead lights and at intersections that have stop signs. For this reason, other devices are placed on emergency vehicles, such as retroreflective tapes and corner reflectors to help the observer identify that they are looking at an emergency vehicle and not a sign or a barricade.

Response:

Prior to responding to a warning light on an emergency vehicle, an observer needs to make some decisions and determinations. For example, the observer determines if they are observing an emergency vehicle or some other object. If it is determined to be an emergency vehicle, the observer determines if it is moving or stationary. If it is moving, the observer determines where the emergency vehicle is moving relative to their position. The observer can determine if the road is a divided road and whether the emergency vehicle in on the other side of the road. The observer can determine if the traffic around them is yielding and where the observer can move to or whether the observer should stop or get out of the way. The observer can determine whether they are observing an emergency scene and whether emergency vehicles are blocking the road. All of these determinations need to be considered prior to taking action to adjust how we are driving.

Figure 1:
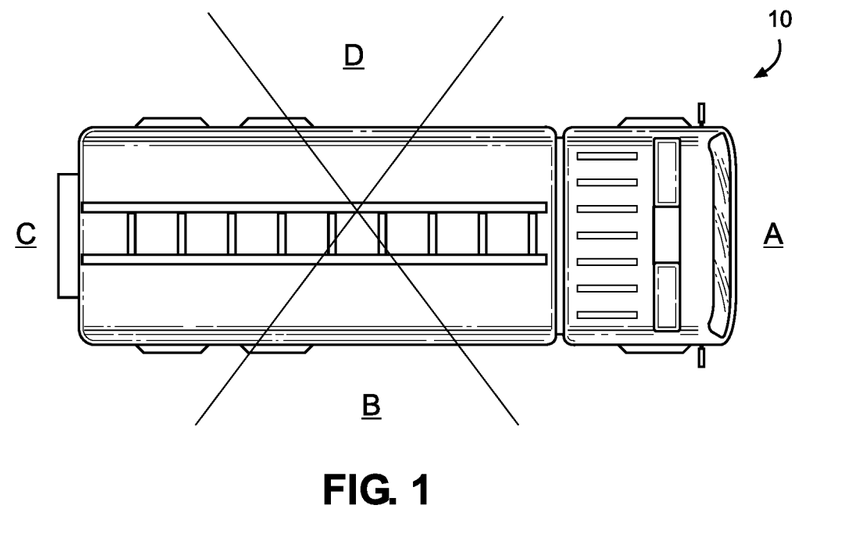
FIG. 1 is a schematic illustration of an emergency vehicle showing four warning zones around the vehicle.

Emergency warning lighting standards such as SAE J2498, NFPA 1901 and KKK 1822 specify the amount of emergency warning light emitted by the emergency vehicle during emergency response and blocking situations. The standards divide the light output into four zones with higher light requirements in the front zone during emergency response mode and higher light requirements to the rear of the vehicle when stopped and in blocking mode. FIG. 1 schematically illustrates four zones divided for an emergency vehicle 10, e.g., a fire truck. The zones include a front zone A, a rear zone C, and side zones B and D.

Changing of the front and rear light output levels is generally controlled by a switch sensing the mode of the vehicle's transmission or by monitoring the Controller Area Network (CAN) serial communications bus on newer vehicles.

Over the years, as technology transitioned from halogen lights to strobe lights and then to LED lighting technology, emergency vehicle lighting systems have become brighter, richer in color and capable of much faster flashing patterns.

End users generally use faster flash patterns during emergency runs when asking for the right of way and use slower flash patterns for blocking situations where the emergency vehicle is stationary at a scene. But in recent years, some end users began using faster flash rates while blocking to increase conspicuity of the blocking vehicle. This shift to faster flash rates while blocking combined with higher light output levels has raised awareness of the annoyance factor from flashing lights for emergency personnel working at an emergency scene, but a study performed by the University of Michigan Motor Transport Institute concluded that the light levels produced by emergency vehicle warning light systems could produce visual annoyance, but are not so bright as to have been cited as the cause of a collision with another vehicle or emergency worker. Recently, it has been proposed to the Fire Apparatus Manufacturers Association and the National Fire Protection Agency to reduce or eliminate flashing of the warning lights at emergency scenes.

Proposals to reduce emergency light levels or eliminate flashing lights at an emergency scene may be one way to reduce the annoyance of bright warning lights, but concerns with some in the industry are that reduced light levels or not flashing the lights will reduce the conspicuity and effectiveness of warning others who are approaching the emergency scene.

According to aspects of the present disclosure, an emergency lighting system for a vehicle, comprises: lighting devices, one of the lighting devices being configured to illuminate a zone or a plurality of zones around an emergency vehicle, another of the lighting devices being configured to direct light in a different direction than the one of the lighting devices to illuminate another of the zones of the plurality of zones; detection devices, one of the detection devices being configured to detect one or more conditions in the zone corresponding to the one of the lighting devices, another of the detection devices being configured to detect one or more conditions in the zone corresponding to the another of the lighting devices; a processor operatively linked to the detection devices and configured to process conditions data obtained by the detection devices; and a controller, the controller being configured to adjust light emission by the corresponding lighting device in the corresponding zone based on the data obtained by the corresponding detection device.

According to further aspects of the present disclosure, and emergency vehicle, comprises: a vehicle body defining a plurality of zones around the vehicle body; lighting devices, one of the lighting devices being configured to illuminate one of the zones of a plurality of zones around an emergency vehicle, another of the lighting devices being configured to direct light in a different direction than the one of the lighting devices to illuminate another of the zones of the plurality of zones; detection devices, one of the detection devices being configured to detect one or more conditions in the zone corresponding to the one of the lighting devices, another of the detection devices being configured to detect one or more conditions in the zone corresponding to the another of the lighting devices; a processor operatively linked to the detection devices and configured to process conditions data obtained by the detection devices; and a controller, the controller being configured to adjust light emission by the corresponding lighting device in the corresponding zone based on the data obtained by the corresponding detection device.

DETAILED DESCRIPTION

What is described is a method for implementing an emergency vehicle lighting system that observes the environment surrounding the emergency vehicle and automatically adapts the warning lighting and white area scene lighting to maintain high conspicuity levels of warning light where needed, while minimizing the annoyance of the emergency warning lights for the emergency personnel at the scene.

When an emergency vehicle is stopped and in blocking mode, one or more of these advantages can be achieved by incorporating one or more detectors, such as a camera or plurality of cameras, either visual or infrared band, a lidar transmitter and receiver, and/or a radar transmitter and receiver, mounted onto an emergency vehicle or in an emergency vehicle light bar. U.S. Pat. No. 9,002,313 describes light bars and the contents of that patent are fully incorporated by reference herein in their entirety. The one or more detectors detect conditions in the zones surrounding the vehicle. An emergency vehicle warning lighting and scene lighting system can observe conditions in the surrounding environment using one or more such detectors and use analytic processing (including but not limited to one or more of video analytic processing, radar analytic processing, and lidar analytic processing) to identify personnel, objects, other vehicles and ambient lighting conditions in the zones around the vehicle. Thus, for example, the observed conditions can include one or more of an ambient light level, an object, a type of object, a movement of an object, a direction of movement of an object, and a speed of an object. Based on the analysis, the system can adjust its own emergency warning and scene lighting system to provide conspicuity from the surrounding environment while reducing lighting energy levels and flashing light annoyance for emergency personnel. A radar transmitter and receiver combination may be referred to herein as a radar transceiver. A lidar transmitter and receiver combination may be referred to herein as a lidar transceiver. Radar transceivers and lidar transceivers may be referred to individually herein, as a transceiver, and the term transceivers can refer to multiple radar transceivers, multiple lidar transceivers, or at least one radar transceiver and at least one lidar transceiver.

The analytics system can also monitor other emergency lighting and emergency personnel's hand/arm gestures at a scene, to provide further control of the emergency vehicle and its lighting system.

Figure 2:
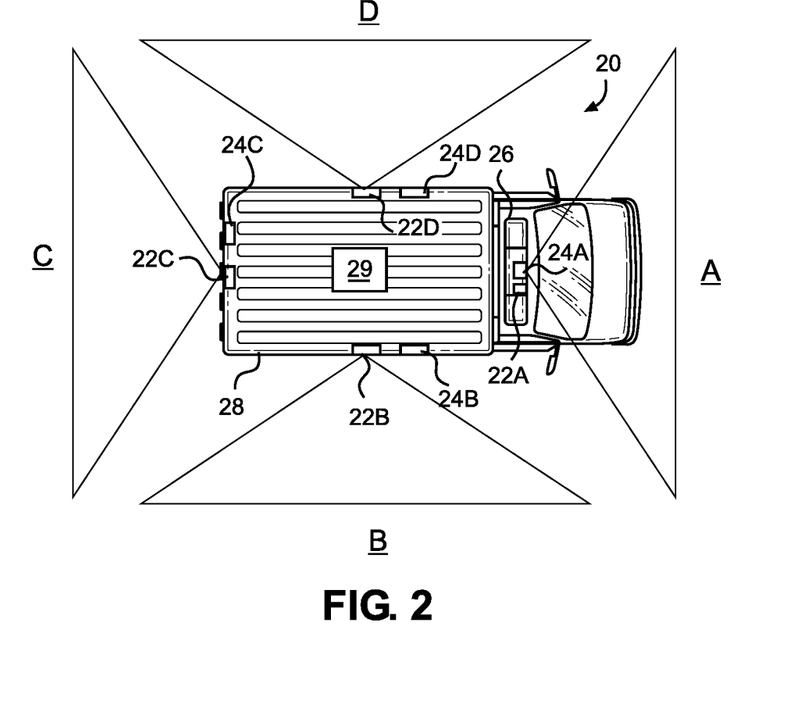
FIG. 2 is a schematic illustration of an example emergency vehicle incorporating features of an emergency vehicle lighting system in accordance with the present disclosure.

One or more cameras or transceivers in a zone can be networked to a central analytics processor either by wired or wireless means to send a stream of video frames or other data (e.g., radar data, lidar data) to the central analytics processor or individual analytics processors. As shown in FIG. 2, a vehicle 20 (e.g., an ambulance) is schematically shown with one camera 22A, 22B, 22C, 22D or transceiver 24A, 24B, 24C, 24D in each zone A, B, C, D, for a total of four cameras and transceivers observing the four zones. The zones A, B, C, D correspond to the same zones as in the vehicle 10 descried above (FIG. 1). It should be appreciated that each zone can include one or both of a camera and transceiver, and/or multiple transceivers and/or multiple cameras. For example, more than one camera and or transceiver can be used for a given zone of the vehicle to provide more detailed analytics. The camera 22A and transceiver 24A are positioned in a rooftop light bar 26 of the vehicle 20. The cameras 22B, 22C and 22D and transceivers 24A, 24B and 24C are positioned in the body of the ambulance box 28. The cameras and transceivers are operatively linked (e.g., via a wired or wireless network) to a central analytics processor (CAP). In this example, the CAP 29 is mounted to the vehicle 20. In other examples, the CAP is not mounted to the vehicle. The CAP 29 receives data from the cameras and/or transceivers and is configured to control the lighting system of the vehicle 20 based on that received data.

Figure 3:
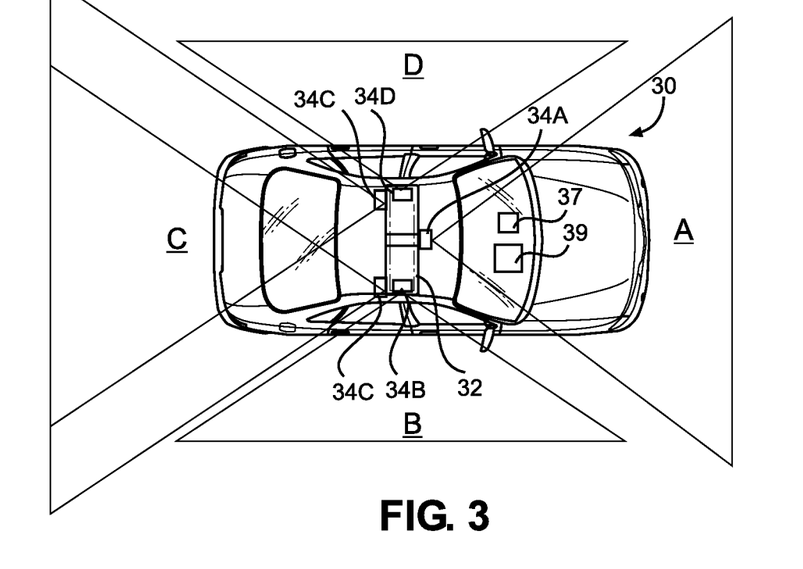
FIG. 3 is a schematic illustration of a further example emergency vehicle incorporating features of an emergency vehicle lighting system in accordance with the present disclosure.

As shown in FIG. 3, for a vehicle 30 (e.g., a police car) an extra camera can be provided for observing one of the zones around the vehicle 30 where precise velocity and distance information is needed. In this example, a single camera or transceiver 34A, 34B, 34D is provided for each of the zones A, B, D, and two cameras and/or transceivers 34C are provided for the zone C. The cameras and/or transceivers are mounted to the rooftop lightbar 32. Those devices 34A, 34B, 34C, 34D send data streams (e.g., streams of video data, radar data, lidar data) to the analytics processor 39 on the vehicle 30 which performs a combination of object, lighting and motion detection analytics processing to automatically make decisions on how to most effectively light the emergency vehicle while traveling to an emergency scene and while blocking at an emergency scene. The analytics processing system could also detect a potential collision or vehicle entering the emergency work scene and energize the emergency warning lights to warn emergency workers at the scene.

This lighting information is sent to the lighting controller 37 that is either part of the central analytics processor 39 or is serially connected to the analytics processor 39.

Figure 4:
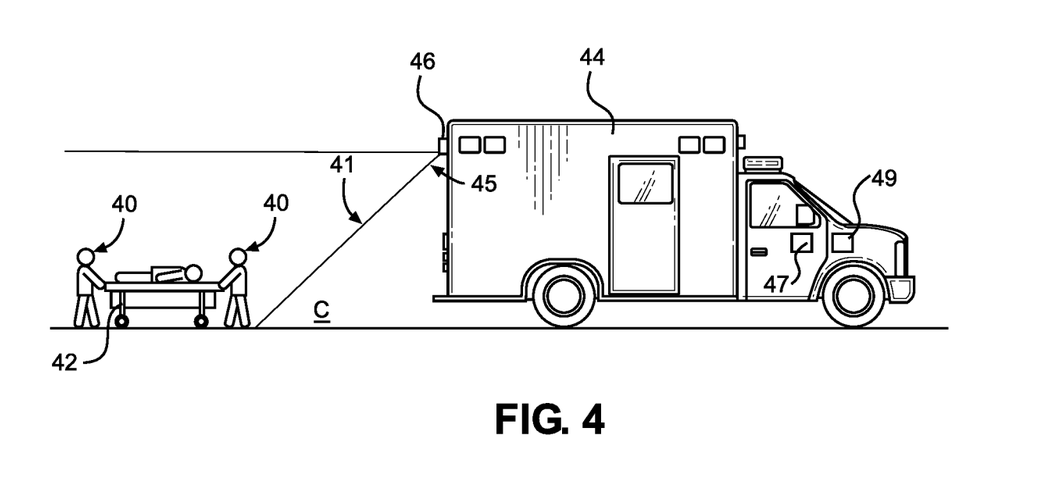
FIG. 4 is a schematic illustration of a further example emergency vehicle incorporating features of an emergency vehicle lighting system in accordance with the present disclosure, the vehicle being located at an emergency site.

In FIG. 4, schematically represented emergency workers 40 push a gurney 42 towards the rear doors of an ambulance 44 parked at an emergency scene. The zone C camera and/or transceiver 46 on the rear of the patient compartment or above in a rear mounted light bar observes the approach of the gurney and/or the workers and sends the corresponding data stream to the video analytics processor 49. The analytics processor 49 recognizes that the emergency workers are approaching the rear doors with a gurney, so the analytics processor 49 sends a message to the lighting controller 47 to turn on the rear down light 45 to illuminate the area 41 around the rear of the ambulance for safer patient loading.

Figure 5:
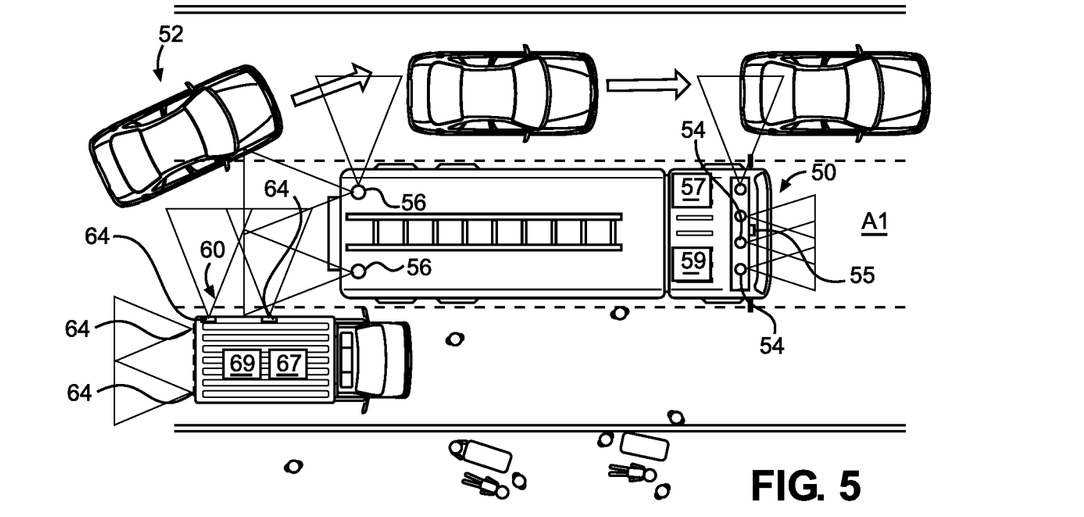
FIG. 5 is a schematic illustration of further example emergency vehicles incorporating features of emergency vehicle lighting systems in accordance with the present disclosure, the vehicles being located at an emergency site.

In FIG. 5, a firetruck 50 and an ambulance 60 are schematically illustrated positioned at an emergency scene to block traffic and create a protective barrier between the emergency work scene and traffic. The traffic is routed through the left lane 52 and around the emergency scene. The analytics processors 59 and 69, respectively, using data from one or more cameras or transceivers trained to different zones around the corresponding vehicle to detect vehicles approaching and moving by and light the appropriate flashing emergency warning lights 54, 56, 64 on the appropriate sides of the corresponding vehicle to warn traffic of the presence of the emergency vehicles. The analytics processors 59, 69, using data from others of the one or more cameras or transceivers also detect movement of workers and the lack of moving vehicles in the emergency work zone, and send a message to the corresponding system controller 57, 67 to deactivate or shut off the emergency warning lights and to light the white scene/area lights on the appropriate sides of the corresponding vehicle to illuminate the emergency work area.

By automatically providing white work area lighting where needed and flashing emergency warning lighting where appropriate, the system minimizes the amount of flashing emergency light in the work area to reduce worker annoyance from the flashing emergency lights, while providing appropriate emergency warning lighting where needed in the vehicle passing area. Programming of the system could be configured to not waste emergency lighting energy to the front of the firetruck 50 as traffic that is directed around the emergency scene continues to move away from the emergency scene as detected by a camera or transceiver 55 in the front zone A1 of the fire truck. If the camera or transceiver 55 for the front zone A1 of the fire truck picks up motion of a vehicle towards the emergency scene, against traffic, the analytics processor 59 would instruct the system controller 57 to increase power to the front warning lights 54 to effectively warn the approaching vehicle of the emergency scene.

The analytics processor 59 will also analyze ambient light levels and light sources around the emergency vehicle and adjust the emergency warning light levels to maintain an appropriate signal to noise ratio above the surrounding ambient light at the scene. For example, if high ambient light levels are detected behind one of the emergency vehicles, the corresponding analytics processor can cause the controller to provide full power warning light in the rear zone of the emergency vehicle. This analytics analysis could include flash rates and intensity of surrounding emergency lights. The video analytics processing could also include temporal information from the surrounding flashing lights and make decisions to send messages to the system controller guiding it to synchronize or not synchronize with the surrounding flashing lights at the emergency scene, depending on system programming.

Figure 6:
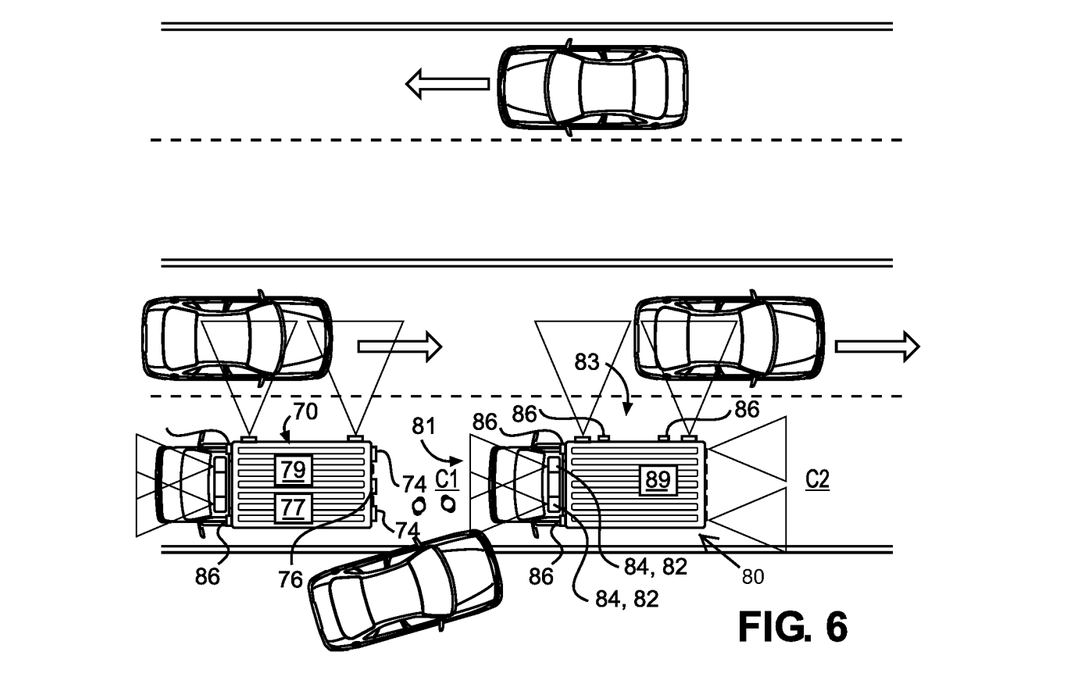
FIG. 6 is a schematic illustration of further example emergency vehicles incorporating features of emergency vehicle lighting systems in accordance with the present disclosure, the vehicles being located at an emergency site.

In FIG. 6, a pair of ambulances 70, 80 are schematically illustrated blocking at an emergency scene while parked opposite the flow of traffic. This would not be unusual as sometimes it is faster for an emergency vehicle to approach the scene by entering the highway using an exit ramp, as long as that exit ramp has been blocked by emergency workers or vehicles. The existing lighting standards guide that the ambulance's emergency warning lighting system should automatically increase emergency warning light levels in the rear zone of the emergency vehicle when the vehicle is in park and is blocking traffic. But in this case, the analytics processor 79 in ambulance 70, using data obtained from one or more cameras and/or transceivers mounted on the ambulance 70, recognizes that the vehicles in motion are approaching from the front and not the rear, as would normally be expected, so emergency warning light levels to the front are set to levels necessary based upon ambient lighting and noise, such as approaching headlights. The analytics processor 79 in ambulance 70 also recognizes, using data obtained from one or more cameras and/or transceivers 74 mounted on the ambulance 70, that ambulance 80 is parked to the rear C1 and that there is emergency worker activity and no vehicles moving in the work area, so the analytics processor 79 of the ambulance 70 instructs the lighting system controller 77 to energize the rear facing, white scene lighting 76 and to shut off or maintain in a deactivated state emergency lights trained to the rear zone C1.

The analytics processor 89 in ambulance 80 also recognizes, using data obtained from one or more cameras and/or transceivers 86 mounted to the ambulance 80 traffic approaching from the front 81, but passing by on the right side 83 and it recognizes the rear of ambulance 70 and emergency workers moving between the two vehicles, so it energizes the front facing, white scene lights 84, but also activates the front emergency warning lights 82 at a reduced energy levels to warn traffic of its presence and to stay out of the emergency scene, while reducing warning light annoyance for the emergency workers in the work area.

In addition, the analytics processor 89 of an ambulance 80 recognizes, using data from one or more cameras or transceivers, traffic moving away from the rear, so it does not automatically increase rearward emergency vehicle lighting levels in the zone C2 to full power, as traffic is moving away. This way electrical power can be conserved.

Figure 7:
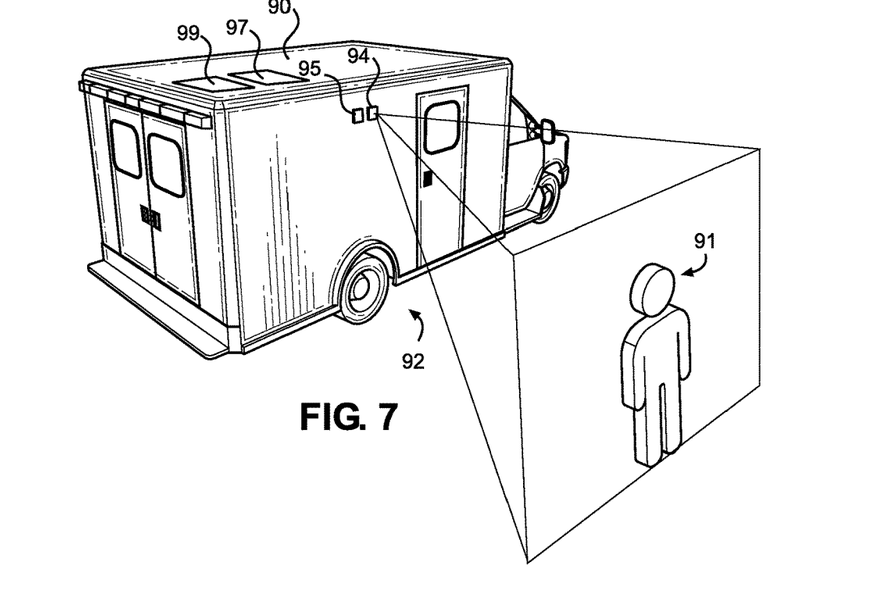
FIG. 7 is a schematic illustration of a further example emergency vehicle incorporating features of an emergency vehicle lighting system in accordance with the present disclosure, the vehicle being shown in the presence of an emergency worker.

FIG. 7 shows a person 91 facing one side 92 of an emergency vehicle 90. By standing parallel to the surface of the vehicle, providing the analytics camera 94 with a full front view of the emergency worker 91, the vehicle and lighting system of the vehicle 90 can be controlled by a sequence of arm and/or hand gestures.

When the emergency worker 91 faces the vehicle and starts an arm gesture sequence, an LED display 95 on that side of the vehicle changes from green to yellow to indicate that the analytics processor 99 is receiving and interpreting a sequence of gestures based on data obtained by the camera 94. When the sequence of gestures is completed, the analytics processor 99 causes a controller 97 to light the red LED steady for 3 seconds to indicate that the gesture is overridden by switch settings in the vehicle or software programming of the system, so the request is refused or the red LED flashes quickly for 3 seconds, if the gesture sequence is not understood. If the gesture sequence is understood and not overridden, the vehicle or lighting system change is executed and the LED indicator goes back to steady green.

Figure 8:
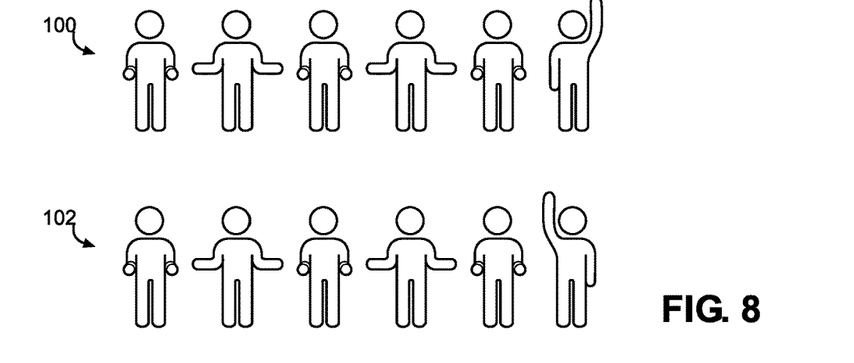
FIG. 8 schematically shows sequences of arm movements that an emergency worker can perform to control features of an emergency vehicle lighting system in accordance with the present disclosure.
Figure 9:
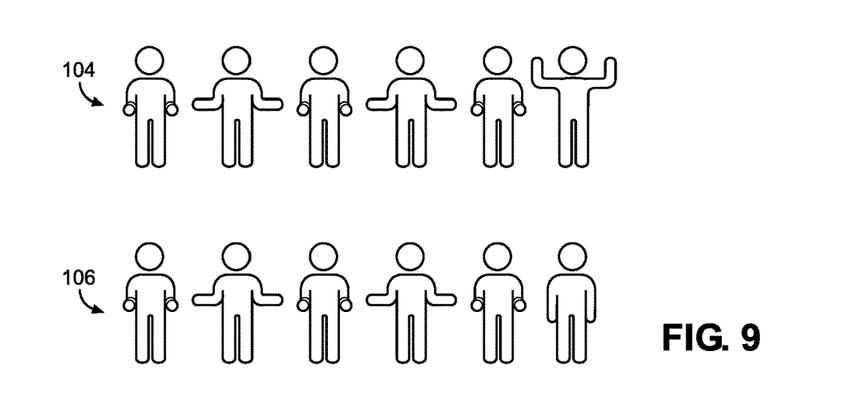
FIG. 9 schematically shows further sequences of arm movements that an emergency worker can perform to control features of an emergency vehicle lighting system according to the present disclosure.

Refer to FIG. 8 and FIG. 9 for examples of arm gestures used to control the vehicle or the lighting system. FIG. 8 schematically illustrates a sequence 100 of arm movement gestures to activate flood lights in one zone of the vehicle and another sequence 102 of arm movement gestures to deactivate flood lights in one zone of the vehicle. FIG. 9 schematically illustrates a sequence 104 of arm movements to activate flood lights in all zones of the vehicle and another sequence 106 of arm movement gestures to deactivate flood lights in all zones of the vehicle. For all sequences 100, 102, 104, 106 the sequence advances chronologically from left to right. In certain examples, the camera 94 (FIG. 7) provides sufficiently high video resolution such that the hand gestures can be detected and interpreted to control vehicle lighting.

Features of emergency warning and scene lighting systems of a vehicle that can be used while the vehicle is in emergency response mode travelling to an emergency scene will now be described.

Due to advances in lighting technology, such as light emitting diodes and laser activated phosphor light sources, emergency warning lighting systems have been able to increase average optical power levels, but have not taken advantage of being able to temporarily further increase power levels through careful monitoring of thermal limitations of the optical light sources. Temporary increases of optical power output could improve conspicuity in bright sunlight situations and situation where there is a high amount of optical noise in the environment.

Using the cameras or lidar or radar transceivers to observe zones around the vehicle while in emergency response mode, objects such as pedestrians, buildings and other vehicles are identified by the analytics processor. The velocity of those objects are analyzed and compared to the velocity of the emergency vehicle and the analytics processor sends commands to the lighting system controller to temporarily increase optical power of the lighting system in zones where objects are calculated to be on a collision course with the emergency vehicle.

Existing technology emergency warning lighting systems monitor temperature internally in the individual light heads by monitoring the temperature of circuit boards and heat sinks and limiting the electrical current to the internal light sources to avoid overheating the light sources and causing thermal damage. This thermal monitoring is internal only and thermal information is not shared with the lighting system controller.

Since in existing technology systems the thermal information of each light head is not available to the system controller, the system controller could instruct a light head to temporarily increase light output, but the light head may not increase light output, if it is already operating at its thermal limit.

Existing technology dual operating mode lights generally have at least three connecting wires to operate the light at full intensity or a dimmed intensity. The three connecting wires are: ground, normal power mode and high power mode.

Based upon instructions from the analytics processor, the system controller activates the light heads in normal power mode when no collision threats have been identified, but raises the light levels in individual heads by activating high power mode for those heads that are in a zone where the analytics processor has identified a collision threat.

Figure 10:
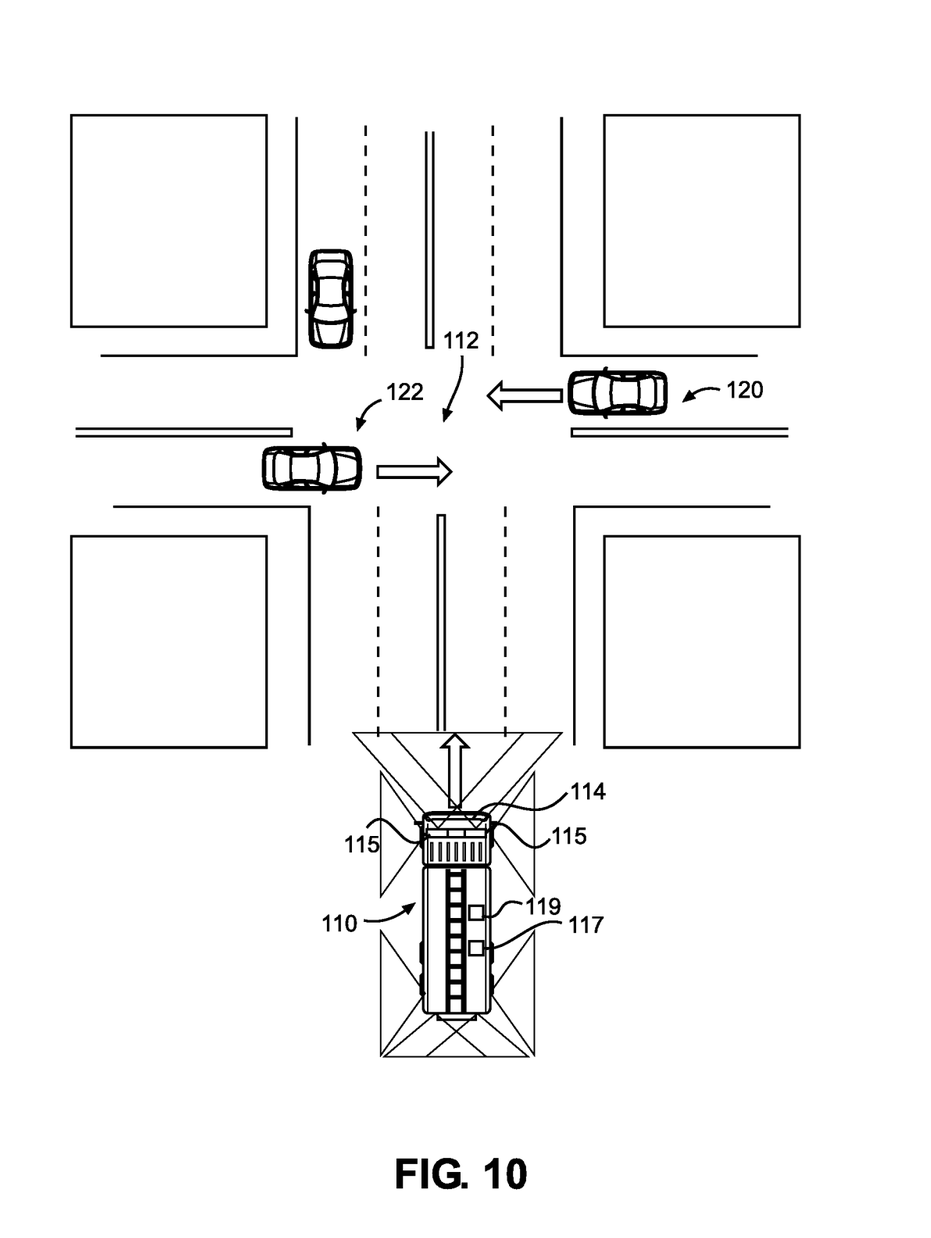
FIG. 10 illustrates example features of an emergency vehicle lighting system according to the present disclosure as an emergency vehicle approaches a roadway intersection.

FIG. 10 schematically illustrates an emergency vehicle 110 approaching an intersection 112. The analytics processor 119 has identified, using data from one or more cameras or transceivers mounted to the vehicle 110 cross traffic 120, 122 traveling through the intersection 112, and the analytics processor 119 instructs the lighting system controller 117 to place the forward facing light heads 114 in high power mode and determines how long it will take for the emergency vehicle 110 to get near the intersection. A short time before the emergency vehicle enters the intersection, the analytics processor 119 instructs the lighting system controller 117 to place the left and right facing emergency warning lights 115 in high power mode to maximize side firing light as the emergency vehicle passes through the intersection.

Figure 11:
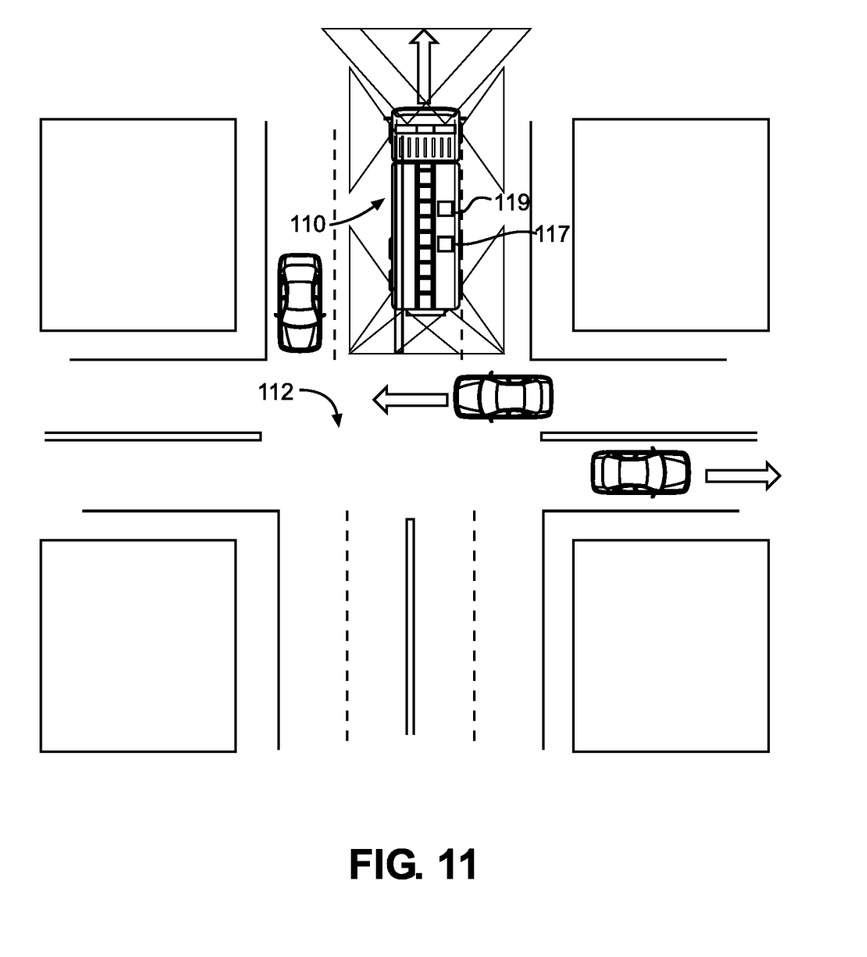
FIG. 11 illustrates example features of an emergency vehicle lighting system according to the present disclosure after an emergency vehicle has passed through a roadway intersection.

FIG. 11 schematically illustrates the same emergency vehicle 110 of FIG. 10 after it has cleared the intersection 112. The analytics processor 119, using data from one or more cameras or transceivers, instructs the system controller 117 to place the front and side firing lights back to normal power mode to enable them to cool, so they are ready for the next time high power mode is required.

Figure 12:
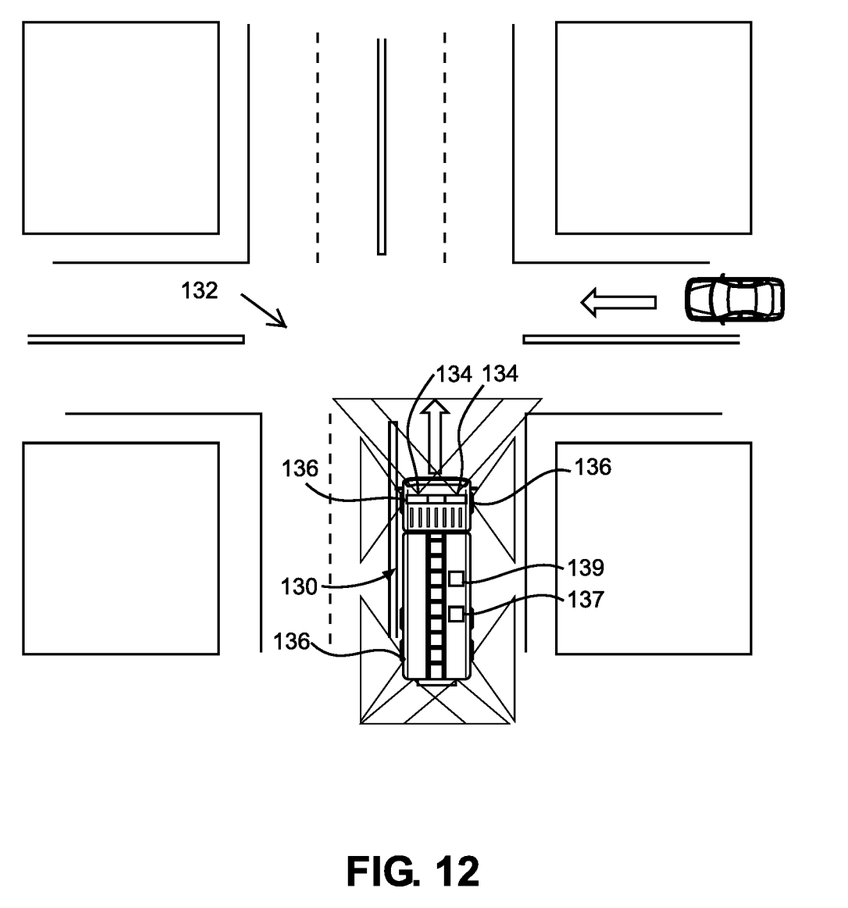
FIG. 12 illustrates further example features of an emergency vehicle lighting system according to the present disclosure as an emergency vehicle approaches a roadway intersection.

FIG. 12 shows an emergency vehicle 130 traveling down a roadway and approaching the intersection 132 with no visible obstructions in the vehicle's path, so the analytics processor 139, using data from one or more cameras or transceivers, instructs the lighting system controller 137 to keep the forward facing warning lights 134 in standard power mode and instructs the lighting system controller 137 to raise the side firing lights 136 to high power mode as the vehicle is encroaching the intersection 132.

Figure 13:
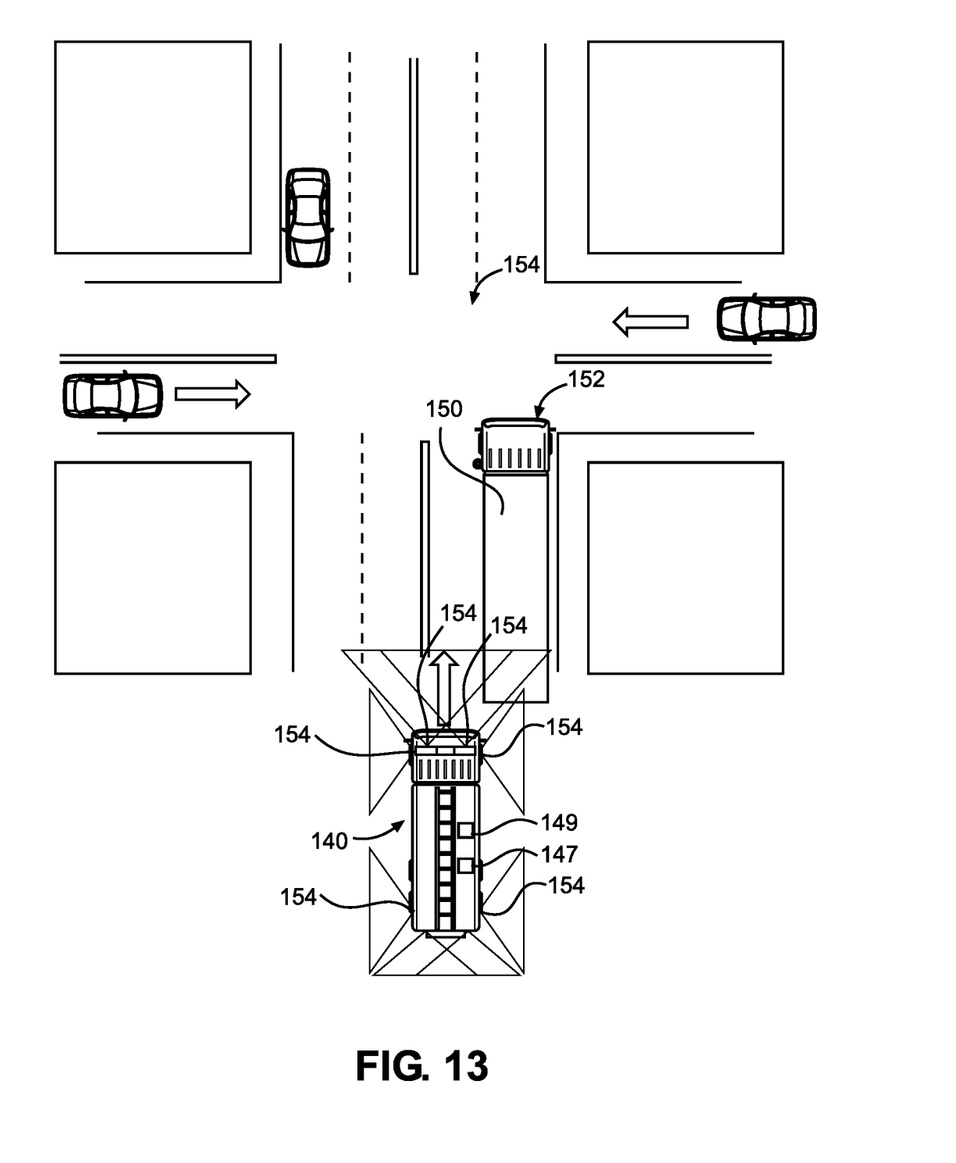
FIG. 13 illustrates further example features of an emergency vehicle lighting system according to the present disclosure as an emergency vehicle approaches a roadway intersection.

In FIG. 13, the analytics processor 149 of the emergency vehicle 140 recognizes, using one or more cameras or transceivers, a large truck 150 obstructing the right lane 152 as the emergency vehicle 140 approaches the intersection 154. In this scenario the analytics processor 149 instructs the lighting system controller 147 to set all lights on the emergency vehicle to high power mode to produce as much light as possible and try to take advantage of reflecting light off of surrounding surfaces.

Figure 14:
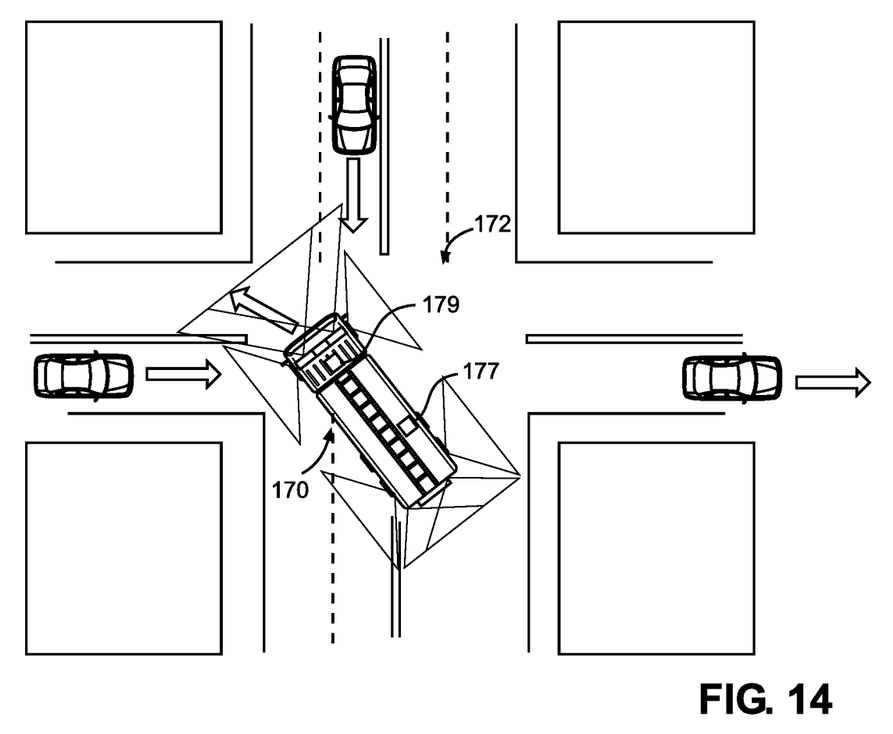
FIG. 14 illustrates further example features of an emergency vehicle lighting system according to the present disclosure as an emergency vehicle approaches and turns at a roadway intersection.

In FIG. 14, an emergency vehicle 170 is schematically illustrated turning at an intersection 172. Through communications with the emergency vehicle's 170 Controller Area Network (CAN) 179, the lighting system controller 177 reads that the emergency vehicle 170 has started turning to the left. The lighting system controller had already been instructed that the emergency vehicle 170 entered an intersection 172 with obstructions, so all forward and side firing warning lights of the were set to high power. The lighting system controller 177 will maintain high power on those light heads until the CAN system 179 reports that the emergency vehicle 170 has completed the turn.

Figure 15:
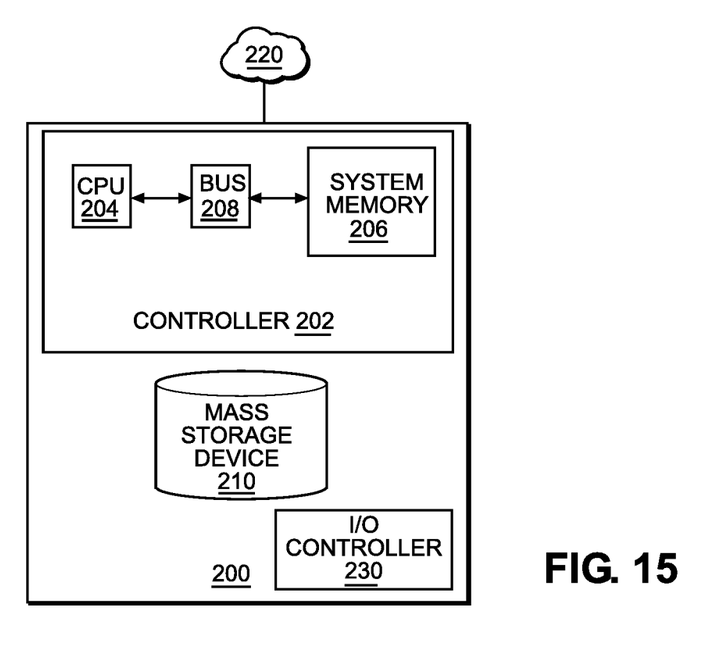
FIG. 15 schematically illustrates an example computing device that can be used by an emergency vehicle lighting system according to the present disclosure to perform one or functions of the emergency vehicle lighting system.

In the examples provided herein, the emergency vehicle lighting systems include one or more computing devices that control aspects of the systems, such as the lights. Such a computing device 200 is schematically represented in FIG. 15. The computing device 200 can include a controller 202 having at least one central processing unit ("CPU" or processor) 204, a system memory 206, and a system bus 208 that couples the system memory to the CPU. The system memory includes a random access memory ("RAM") and a read-only memory ("ROM"). The computing devices can further include a mass storage device 210. The mass storage device 210 is able to store software instructions and data. One or more of these memories can be used to store one or more oscillating light patterns.

The mass storage device 210 and its associated computer-readable data storage media provide non-volatile, non-transitory storage for the computing device 200. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing devices.

According to various embodiments, the emergency vehicle lighting systems may operate in a networked environment using logical connections to remote network devices through a network 220, such as a wireless network, the Internet, or another type of network. The computing device(s) may also include an input/output controller 230 for receiving and processing input from a number of other devices, including a touch user interface display screen, or another type of input device. Similarly, the input/output controller may provide output to a touch user interface display screen or other type of output device.

As mentioned, the mass storage device and the RAM of the computing devices can store software instructions and data, such as software instructions that the analytics processors of this disclosure execute based on data obtained from one or more cameras and transceivers to provide signals to the controllers of the present disclosure to control the lights of the vehicle. The software instructions include an operating system suitable for controlling the operation of the computing devices. The mass storage device and/or the RAM also store software instructions, that when executed by the CPU, cause the computing devices to provide the functionality of the controllers discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An emergency lighting system for a vehicle, comprising:
    lighting devices, one of the lighting devices being configured to illuminate a zone of a plurality of zones around an emergency vehicle, another of the lighting devices being configured to direct light in a different direction than the one of the lighting devices to illuminate another of the zones of the plurality of zones;
    detection devices, one of the detection devices being configured to detect one or more conditions in the zone corresponding to the one of the lighting devices, another of the detection devices being configured to detect one or more conditions in the zone corresponding to the another of the lighting devices;
    a processor operatively linked to the detection devices and configured to process conditions data obtained by the detection devices; and
    a controller, the controller being configured to adjust light emission by the corresponding lighting device in the corresponding zone based on the data obtained by the corresponding detection device,
    wherein the lighting devices include a warning lighting device and a white scene lighting device both configured to, based on the data obtained by the corresponding detection device, illuminate the same zone of the plurality of zones; and
    wherein the processor is configured, based on the data obtained by the corresponding detection device, to cause the controller to:
        (i) activate or maintain in an activated state or increase a lighting power of the white scene lighting device and deactivate or maintain in a deactivated state or decrease a lighting power of the warning light device; or (ii) deactivate or maintain in a deactivated state or decrease a lighting power of the white scene lighting device and activate or maintain in an activated state or increase a lighting power of, the warning light device.

2. The system of claim 1, wherein the detection devices include one or more of a camera, a radar transmitter and a radar receiver, and a lidar transmitter and a lidar receiver.

3. The system of claim 1, wherein the lighting devices include a flashing or strobing lighting device.

4. The system of claim 1, wherein the lighting devices include both a white light emitting device and a non-white light emitting device.

5. The system of claim 1, wherein the one or more conditions include one or more of an ambient light level, an object, a type of an object, a movement of an object, a direction of movement of an object, and a speed of an object.

6. The system of claim 1, wherein there is at least one of the lighting devices and at least one of the detection devices for each of at least four zones of the plurality of zones.

7. The system of claim 1, further comprising a controller area network system, wherein the lighting system is configured to adjust light emission by the lighting devices based on vehicular motion data provided by the controller area network system.

8. An emergency vehicle, comprising:
a vehicle body defining a plurality of zones around the vehicle body;
lighting devices, one of the lighting devices being configured to illuminate one of the zones of a plurality of zones around an emergency vehicle, another of the lighting devices being configured to direct light in a different direction than the one of the lighting devices to illuminate another of the zones of the plurality of zones;
detection devices, one of the detection devices being configured to detect one or more conditions in the zone corresponding to the one of the lighting devices, another of the detection devices being configured to detect one or more conditions in the zone corresponding to the another of the lighting devices;
a processor operatively linked to the detection devices and configured to process conditions data obtained by the detection devices; and
a controller, the controller being configured to adjust light emission by the corresponding lighting device in the corresponding zone based on the data obtained by the corresponding detection device,
wherein the lighting devices include a warning lighting device and a white scene lighting device both configured to, based on the data obtained by the corresponding detection device, illuminate the same zone of the plurality of zones; and
wherein the processer is configured, based on the data obtained by the corresponding detection device, to cause the controller to:

(i) activate or maintain in an activated state or increase a lighting power of the white scene lighting device and deactivate or maintain in a deactivated state or decrease a lighting power of the warning light device; or (ii) deactivate or maintain in a deactivated state or decrease a lighting power of the white scene lighting device and activate or maintain in an activated state or increase a lighting power of, the warning light device.

9. The emergency vehicle of claim 8, wherein the detection devices include one or more of a camera, a radar transmitter and a radar receiver, and a lidar transmitter and a lidar receiver.

10. The emergency vehicle of claim 8, wherein the lighting devices include a flashing or strobing lighting device.

11. The emergency vehicle of claim 8, wherein the lighting devices include both a white light emitting device and a non-white light emitting device.

12. The emergency vehicle of claim 8, wherein the one or more conditions include one or more of an ambient light level, an object, a type of an object, a movement of an object, a direction of movement of an object, and a speed of an object.

13. The emergency vehicle of claim 8, where the plurality of zones includes a total of four zones, and wherein there is at least one of the lighting devices and at least one of the detection devices for each of the four zones.

14. The emergency vehicle of claim 8, further comprising a controller area network system, wherein the lighting system is configured to adjust light emission by the lighting devices based on vehicular motion data provided by the controller area network system.

* * * * *

UNITED STATES PATENT AND TRADEMARK OFFICE
CERTIFICATE OF CORRECTION

PATENT NO. : 11,396,258 B2  
APPLICATION NO. : 17/017947  
DATED : July 26, 2022  
INVENTOR(S) : Joseph F. Bader Page 1 of 1

It is certified that error appears in the above-identified patent and that said Letters Patent is hereby corrected as shown below:

In the Claims

Column 11, Lines 2-3, Claim 1: "warning light device;" should read --warning lighting device;--

Column 11, Lines 7-8, Claim 1: "warning light device." should read --warning lighting device.--

Column 12, Lines 16-17, Claim 8: "warning light device;" should read --warning lighting device;--

Column 12, Lines 19-20, Claim 8: "warning light device." should read --warning lighting device.--

Signed and Sealed this  
Nineteenth Day of August, 2025

Coke Morgan Stewart  
*Acting Director of the United States Patent and Trademark Office*